US007240845B2

(12) United States Patent
Komine et al.

(10) Patent No.: US 7,240,845 B2
(45) Date of Patent: Jul. 10, 2007

(54) INFORMATION-HOLDING UNIT

(75) Inventors: Tsuyoshi Komine, Hyogo (JP); Hidehito Nakajima, Osaka (JP)

(73) Assignees: Big Daishowa Seiki Co., Ltd., Osaka (JP); Big Alpha Co., Inc., Hyogo (JP)

( * ) Notice: Subject to any disclaimer, the term of this patent is extended or adjusted under 35 U.S.C. 154(b) by 0 days.

(21) Appl. No.: 10/237,977

(22) Filed: Sep. 10, 2002

(65) Prior Publication Data

US 2003/0156401 A1  Aug. 21, 2003

(30) Foreign Application Priority Data

Feb. 21, 2002  (JP) ............................. 2002-044188

(51) Int. Cl.
*G06K 19/06* (2006.01)
*G06K 19/00* (2006.01)
*G06F 19/00* (2006.01)
(52) U.S. Cl. .................. 235/492; 235/487; 700/160
(58) Field of Classification Search ................ 235/375, 235/376, 439, 451, 487, 492; 700/175, 179, 700/160; 340/870.31, 10.41, 10.42
See application file for complete search history.

(56) References Cited

U.S. PATENT DOCUMENTS

| 4,720,907 A * | 1/1988 | Rapp ........................... 235/439 |
| 4,742,470 A | 5/1988 | Juengel |
| 4,773,800 A | 9/1988 | Furuhashi et al. |
| 4,856,820 A | 8/1989 | Kasprzak et al. |
| 5,257,199 A | 10/1993 | Tsujino et al. |
| 5,345,231 A * | 9/1994 | Koo et al. ............. 340/870.31 |
| 5,360,967 A | 11/1994 | Perkin et al. |
| 6,008,727 A * | 12/1999 | Want et al. ............... 340/10.42 |
| 6,104,291 A * | 8/2000 | Beauvillier et al. ...... 340/572.1 |
| 6,163,734 A * | 12/2000 | Shigefuji et al. ........... 700/160 |
| 6,297,727 B1 * | 10/2001 | Nelson, Jr. .................. 340/10.1 |
| 2001/0017322 A1 * | 8/2001 | Duldhardt .................... 235/492 |

FOREIGN PATENT DOCUMENTS

| DE | 201 10 585 U 1 | 12/2001 |
| EP | 0 155 662 | 9/1985 |
| EP | 1 130 485 A1 | 9/2001 |
| GB | 2 073 550 A * | 10/1981 |
| JP | 62-251038 A | 10/1987 |
| JP | 3-49848 A | 3/1991 |
| JP | 11-221727 | 8/1999 |
| JP | 2000-148950 | 5/2000 |
| JP | 2000-285170 | 10/2000 |
| JP | 2000-285636 A | 10/2000 |
| JP | 2001-014433 A | 1/2001 |
| JP | 2001-156674 A | 6/2001 |
| JP | 2001-265888 | 9/2001 |
| JP | 2001-315920 A | 11/2001 |

OTHER PUBLICATIONS

*IC Code System*, Catalog No. 96-1, Big Daishowa Seiki Co., Ltd, no date available.
European Search Report Dated Jul. 10, 2003.
European Search Report dated Feb. 23, 2005 in corresponding patent Application No. 02 256 220.1-2210.
JPO Examiner Mitsuhiro Murata, Japanese Office Action, Nov. 14, 2006, pp. 1-3.

* cited by examiner

*Primary Examiner*—Jared J. Fureman
(74) *Attorney, Agent, or Firm*—Roberts, Mlotkowski & Hobbes; Thomas W. Cole

(57) ABSTRACT

An information-holding unit is provided which can minimize increase in cost and which can increase storage capacity as a whole without changing information transferring time. The information-holding unit comprises a plurality of RFID tags with desired specific information stored therein, and a tool holder as a mounting body for mounting these plural RFID tags.

7 Claims, 7 Drawing Sheets

INFORMATION-HOLDING UNIT

BACKGROUND OF THE INVENTION

1. Field of the Invention

The present invention relates to an information-holding unit on which information carriers with specific information stored therein are mounted.

2. Description of the Related Art

An information-holding unit has been used and made by mounting, on various articles, an information carrier such as a magnetic card, an IC (integrated circuit) card, a bar code, or RFID (Radio Frequency Identification) that stores specific information about such articles. Systems that use such information-holding unit, for example, for identification, collating, management, or conveyance of the above-mentioned articles, are employed in wide-ranging areas such as distribution, FA (Factory Automation), and medical care.

Recently, a non-contact automatic identification system that utilizes RFID techniques capable of reading, without any contact, an IC chip as the information carrier, on which information is written, has been widely used, for example, in product assembly and conveying line systems, inspection lines, product management, product inventory and order management, work information management, and tool management. For example, at manufacturing plants or other locations, the non-contact automatic identification system is used to attach IC chips to tools for machine tools, to prevent errors in attaching the tools to the machine tools, to improve efficiency in arrangement, to register offset information automatically, and to conduct location management. Moreover, PC networks are utilized to share information about manufacturing plants (or job sites), thereby enhancing the efficiency and quality of the production and accumulating processing know-how.

Since the conventional information carrier is generally constructed by mounting one information carrier on an article, if the desired amount of information to be stored is large, one of the possible methods is the method of increasing the storage capacity of the information carrier or having the information carrier carry a code and drawing necessary information from an information server.

However, if the storage capacity of the information carrier is increased, it brings about the drawbacks that it will become expensive and will require longer information transferring time (or time required for sending/receiving information).

In the case of the RFID, the dominant type of RFID saves power in an IC chip by using high-frequency waves to be transmitted as a power source and operates with the saved power as the power source. This type of RFID has the drawback that if the storage capacity of the information carrier is increased, the required driving power should also be increased.

SUMMARY OF THE INVENTION

The aim of the present invention is to solve the above-mentioned conventional problems. It is an object of this invention to provide an information-holding unit capable of minimizing increase in cost and of increasing storage capacity as a whole without changing information transferring time.

In order to achieve this object, this invention provides an information-holding unit comprising:

information carriers with specific information stored therein; and a mounting body for mounting the information carriers; wherein each of the information carriers is an RFID tag.

The information-holding unit of this structure can increase the storage capacity as a whole without extending the information transferring time by providing a plurality of information carriers without changing the storage capacity of the respective information carriers themselves. Moreover, even if the type of information-holding unit that saves power in an IC chip by using high-frequency waves to be transmitted as a power source and operates with the saved power as the power source is used, it is unnecessary to increase the driving power per information carrier.

The information carriers can be constructed in a manner such that their colors are all different from each other. As a result, it is possible to easily identify the use and details of the respective information carriers and to quickly and easily obtain necessary information.

Concerning the information-holding unit of this invention, it is possible to cause at least one of the information carriers to store information about the information-holding unit. This information about the information-holding unit may be a single code of the information-holding unit. Also, the information about the information-holding unit maybe reference information (such as catalogues, instruction manuals, usage conditions, and prize points) of the information-holding unit.

Moreover, concerning the information-holding unit of this invention, it is possible to cause at least one of the information carriers to store information about a system using the information-holding unit.

Furthermore, concerning the information-holding unit of this invention, it is possible to cause at least one of the information carriers to store information about a user of the information-holding unit and/or the system using the information-holding unit.

Concerning the information-holding unit of this invention, the mounting body can be a rotating body and the information carriers can be mounted so that they are symmetrical with respect to the rotation axis of the mounting body. With this construction, it is possible to minimize rotation unbalance arising at the time of rotations of the information-holding unit. It is also possible to cope with high-speed rotations.

Moreover, examples of the mounting body include a work mounting jig, a cutter, a cutter cartridge, or a tool holder.

DETAILED DESCRIPTION OF THE PREFERRED EMBODIMENTS

Preferred embodiments of the information-holding unit according to this invention are hereinafter explained with reference to the attached drawings.

Figure 1:
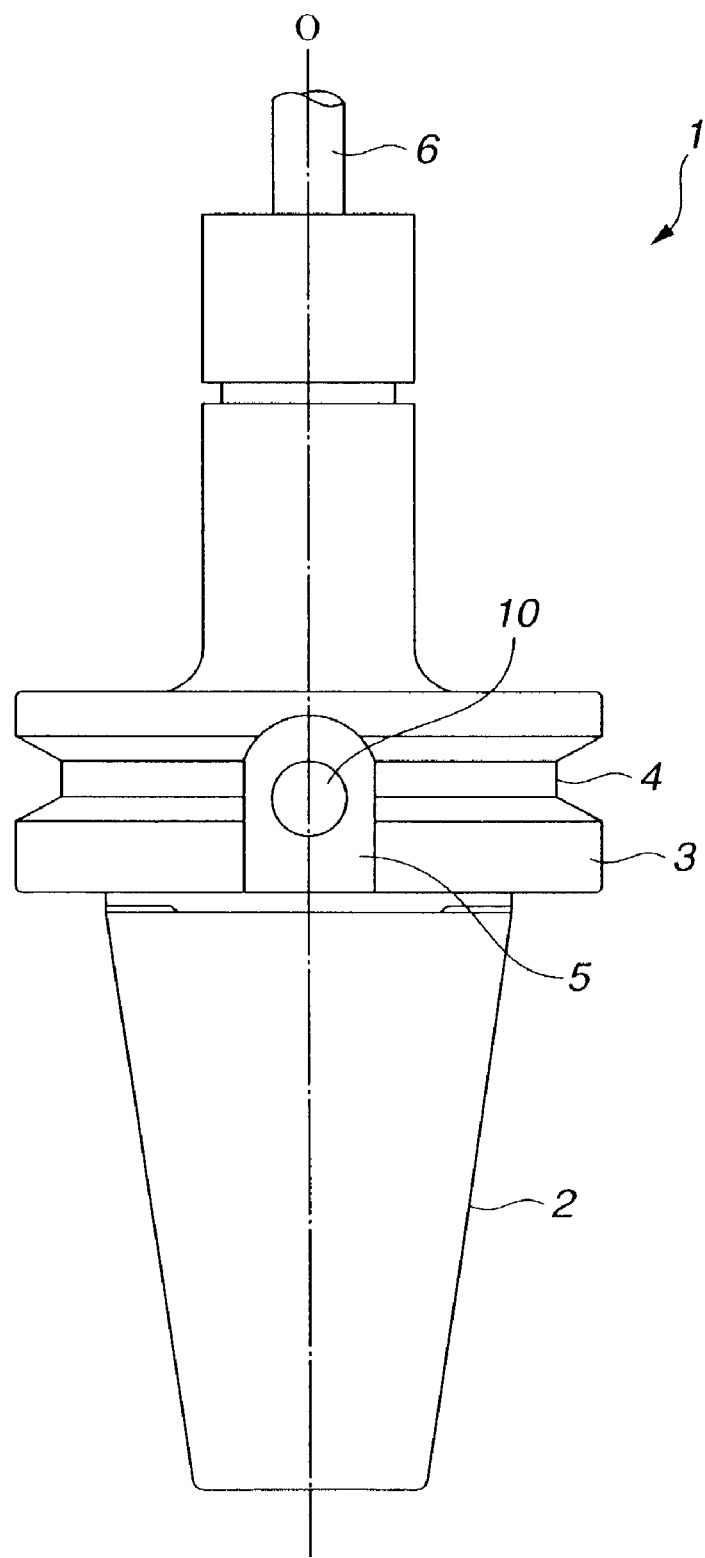
FIG. 1 is a front view of the information-holding unit according to an embodiment of this invention.
Figure 2:
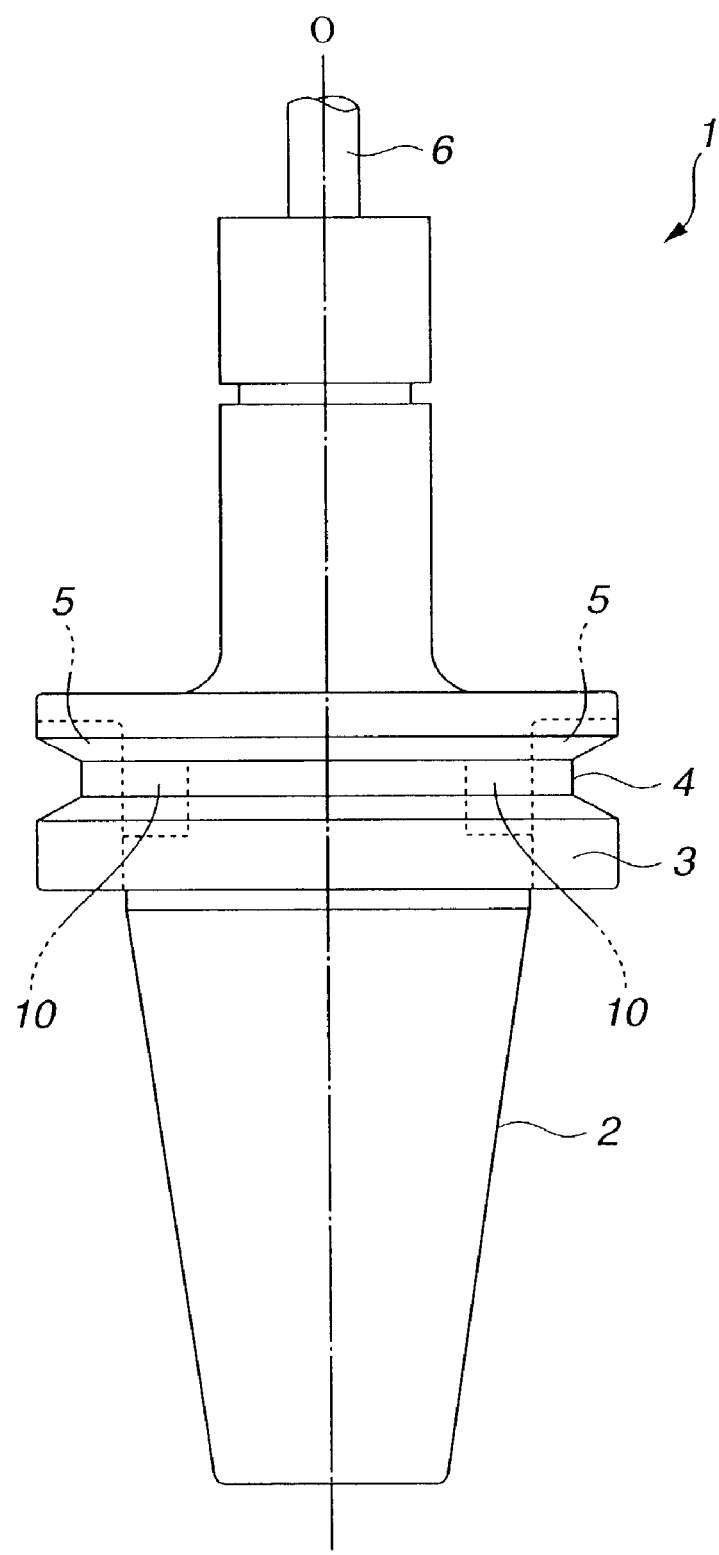
FIG. 2 is a side view of the information-holding unit according to the embodiment of this invention.
Figure 3:
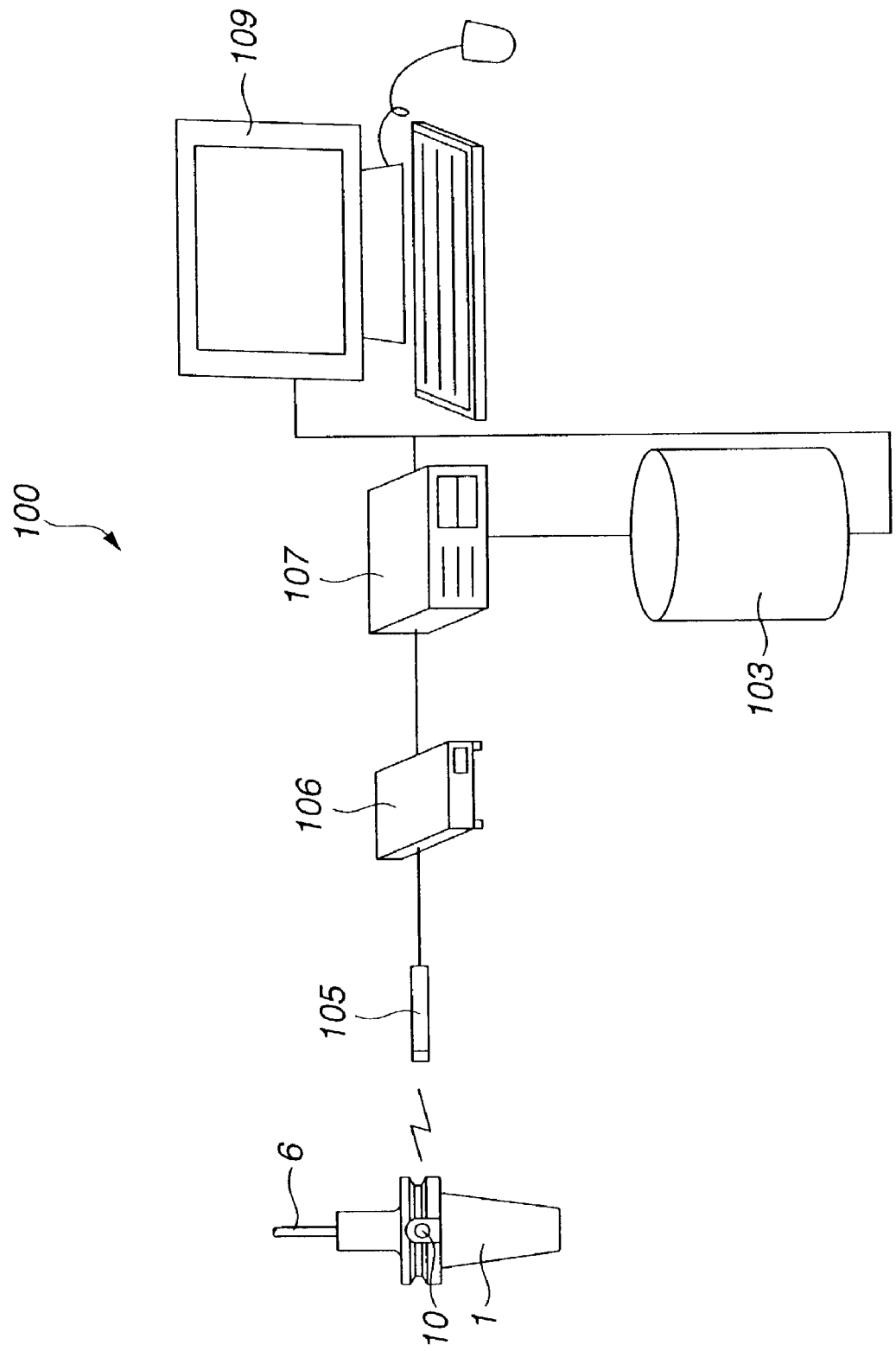
FIG. 3 is a diagrammatic illustration of the concept of a system using the information-holding unit of FIG. 1.
Figure 4:
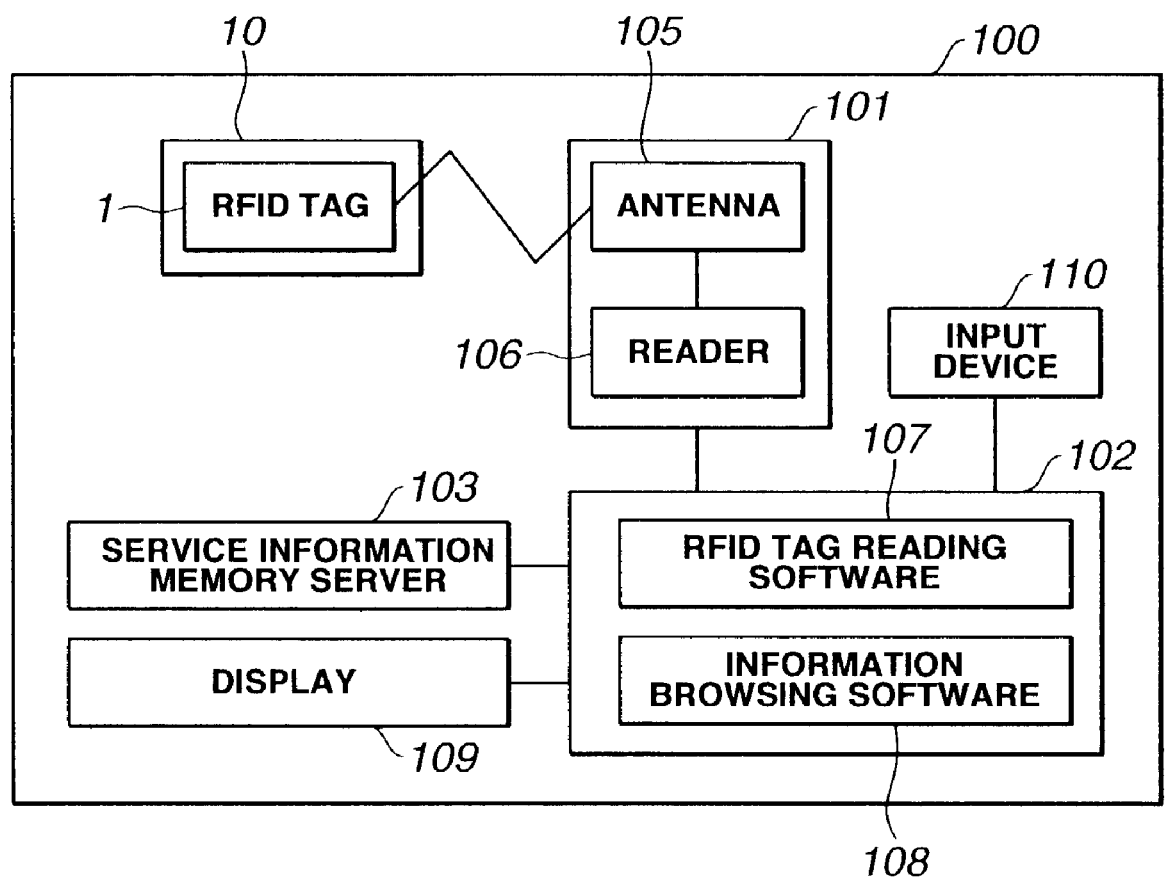
FIG. 4 is a block diagram of the system using the information-holding unit of FIG. 1.

FIG. 1 is a front view of the information-holding unit according to an embodiment of this invention. FIG. 2 is a side view of the information-holding unit of FIG. 1. FIG. 3 is a diagrammatic illustration of the concept of a system using the information-holding unit of FIG. 1. FIG. 4 is a block diagram of the system using the information-holding unit of FIG. 1.

A tool 1 as the information-holding unit as shown in FIG. 1 has a reference rotation axis O, and a cutter 6 is mounted at the top end thereof. This tool 1 has a tapered shank 2 which engages with a tapered hole in a main spindle of a machine tool (not shown in FIG. 1). The tool 1 also has a flange 3 which is formed in connection with the tapered shank 2 so as to be opposite the end face of the main spindle. This flange 3 has, on its outer surface, a groove 4 to be held by a well-known manipulator. Concave parts 5 are respectively formed on the outer surface around the circumference of the flange 3 at evenly spaced positions, 180 degrees apart (i.e. at symmetrical positions with respect to the rotation axis O). A total of two RFID tags 10 are attached to the concave parts 5, one RFID tag for each concave part 5. These RFID tags 10 are to be made in different colors (for example, by making one in red and the other in blue), so that users can easily identify the use and details of each RFID tag 10 and can quickly and easily obtain necessary information.

In this embodiment, the employed type of RFID tag 10 saves power within the tag by using high-frequency waves to be transmitted as a power source and operates with the saved power as the power source.

In this embodiment, one of the two RFID tags 10 stores the serial number of the tool 1, which is a single code and which is the information stored by a producer who provides the tool 1. The other RFID tag 10 stores keyword information for searching service information, as the information that is stored by a producer who provides a system 100 using the tool 1 as described below in detail. At this time, an EEPROM (electrically erasable and programmable ROM) can be used as the other RFID tag 10 (in which the producer who provides the system 100 stores arbitrary information). In this case, the producer who provides the system 100 can cause the other RFID tag (such as EEPROM) to easily store arbitrary information at any given time.

Since the tool 1 of the above-described construction has two RFID tags 10 attached thereto, it is possible to increase the storage capacity as a whole without changing the storage capacity of the respective RFID tags 10 themselves. Accordingly, neither the information transferring time will become long nor will a larger amount of driving power per RFID tag 10 be required. Moreover, since the RFID tags 10 are in the same shape and are mounted symmetrically with respect to the rotation axis O, it is possible to attain a good rotation balance even at the time of high-speed rotations of the tool 1.

The system 100 using the tool 1 is hereinafter explained with reference to the relevant drawings.

As shown in FIGS. 3 and 4, the system 100 using the tool 1 comprises: a reading device 101 for reading information from the RFID tags 10; a control device 102 for processing the information read by the reading device 101; a service information memory 103 connected via a network to the control device 102; an input device 110 (such as a keyboard, a mouse, or a scanner) connected to the control device 102; and a display 109.

The reading device 101 comprises: an antenna 105 for receiving information from the RFID tags 10, and a reader 106 for reading the information received by the antenna 105.

The control device 102 comprises RFID tag reading software 107 and information browsing software 108. The RFID tag reading software 107 has various menus such as history information of the tool 1, information about applications, arrangement instructions for the tool 1, total use time, remaining lifetime, work information management, tool inventory management, catalogues of the tool 1, manuals, specifications, recommended cutting conditions, prize points, and news relating to products. This RFID tag reading software 107 has a table to correlate the information inputted from the reading device 101 with specific menu items which are designated by a user and are inputted from the input device 110. The RFID tag reading software 107 outputs information searched from this table to the information browsing software 108.

When the information about the menu items designated by the user is the information stored in a database within the control device 102, the information browsing software 108 searches the necessary information in this database on the basis of the information searched from the table and outputs the search results on the display 109 in an arbitrary layout.

On the other hand, if the information about the menu items designated by the user is not stored in the database within the control device 102, but will be provided by the service information memory server 103, the information browsing software 108 searches necessary information from the service information memory server 103 on the basis of the information searched from the above-mentioned table, and outputs the search results on the display 109 in an arbitrary layout.

The RFID tag reading software 107 can send user information together with the information on the RFID tags 10 by, for example, storing desired user information in advance.

The service information memory 103 can use text-editing software or database software for the information management as described above.

As a further specific example, when the tool 1 is set on a tool presetter (not shown in the drawings), the reader 106 reads the serial number received by the antenna 105 from one RFID tag 10 mounted on the tool 1. Subsequently, the RFID tag reading software 107 sends, on the basis of the content selected by the user from the menu, desired information (such as arrangement instructions) corresponding to the serial number read by the reader to the information browsing software 108, which then searches desired information and causes the search results to be displayed on the display 109. It is also possible to register, in a magazine list, the tool size, tool correction values and other data as measured by the tool presetter and to send (or transfer) that data to the machine tool. The data sent to the machine tool can be reflected in an offset memory immediately or at the cycle start timing.

By selecting the menu of the RFID tag reading software 107, it is possible to cause the display 109 to display other contents corresponding to the serial number (such as the total use time of the tool 1, remaining lifetime, NC program management, work information management, tool inventory management, catalogues of the tool 1, manuals, specifications, recommended cutting conditions, prize points, and related news).

When the tool 1 is mounted on the machine tool, it is possible to quickly and accurately attach or detach a magazine of the tool 1 by causing the reader 106 to read the received serial number and the RFID reading software 107 to automatically collate the serial number in the same manner as described above.

Figure 5:
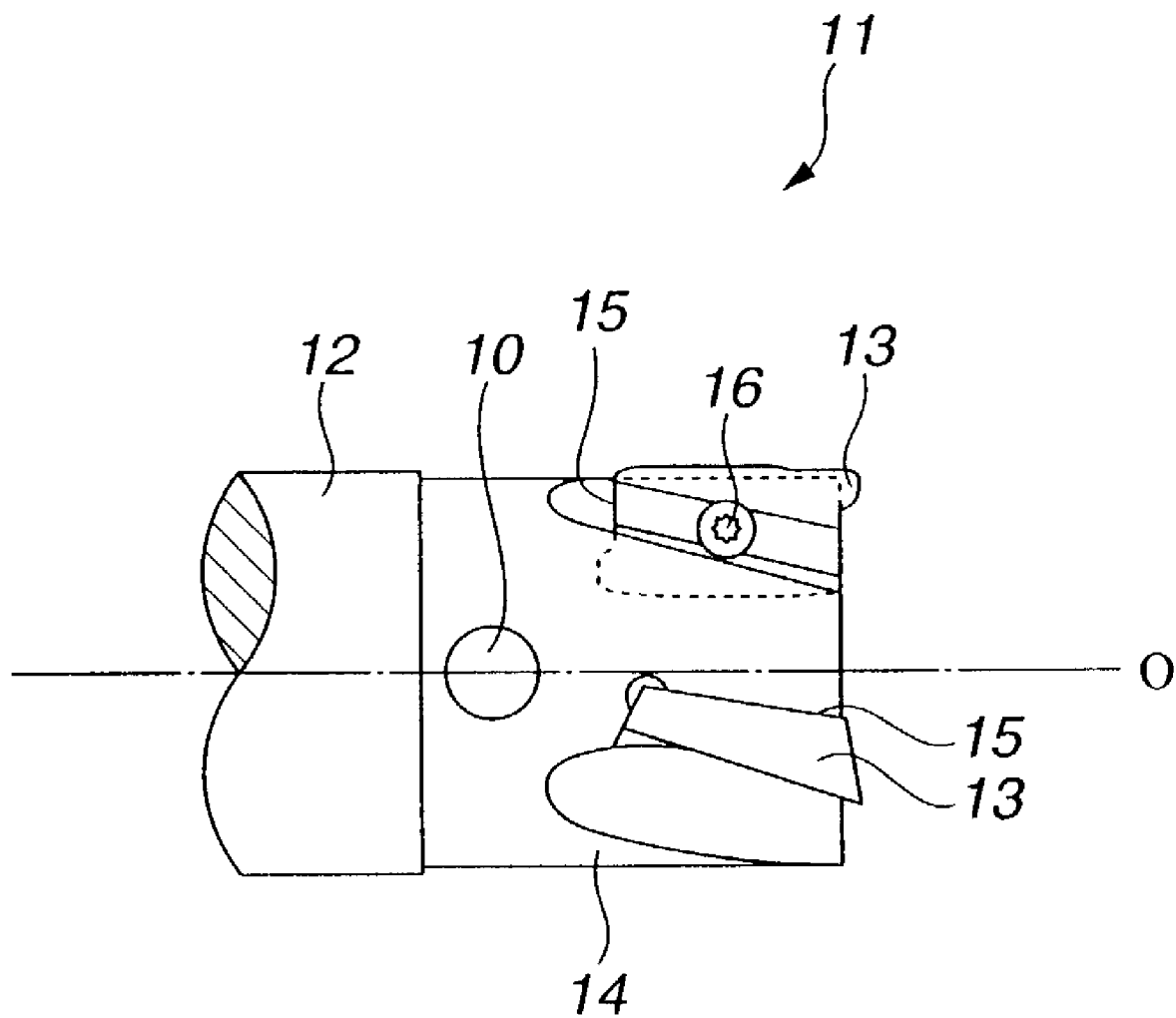
FIG. 5 is a side view of the information-holding unit according to another embodiment of this invention.

Concerning this embodiment, the tool 1 as shown in FIG. 1 has been described as the information-holding unit. However, without limitation to such construction, a tool having other constructions may be used. The information-holding unit may be a throw-away end mill cutter 11 as shown in FIG. 5. This throw-away end mill cutter 11 includes a cutter body 12 and a plurality of inserts 13 (three inserts in this embodiment) attached to the top end of the cutter body 12.

The cutter body 12 has the reference rotation axis O, and includes a cutting head 14 to which a plurality of inserts 13 are mounted. The cutting head 14 has pockets 15 for receiving the respective inserts 13, and the pockets 15 are formed at positions spaced equidistantly. The insert 13 is retained within the pocket 15 by means of a set screw 16. A total of two RFID tags 10 are mounted, at evenly spaced positions at 180 degrees apart (i.e. at symmetrical positions with respect to the rotation axis O) on the base-end side of the cutting head 14 of the cutter body 12, one RFID tag at each position. These RFID tags 10 are also to be made in different colors (for example, by making one RFID tag in green and the other in black) so that a user can easily identify the use and details of each RFID tag 10 and can quickly and easily obtain necessary information.

Similar to the tool 1 described above, the throw-away end mill cutter 11 having the above-described construction has two RFID tags 10 attached thereto. Accordingly, it is possible to increase the storage capacity as a whole without changing the storage capacity of the respective RFID tags themselves and without extending the information transferring time. Also, it is unnecessary to increase the driving power per RFID tag 10. Moreover, since the RFID tags 10 are in the same shape and are mounted symmetrically with respect to the rotation axis O, it is possible to attain a good rotation balance even at the time of high-speed rotations of the throw-away end mill cutter 11. This throw-away end mill cutter 11 can also be used for the system 100 in the same manner as in the aforementioned embodiment.

Figure 6:
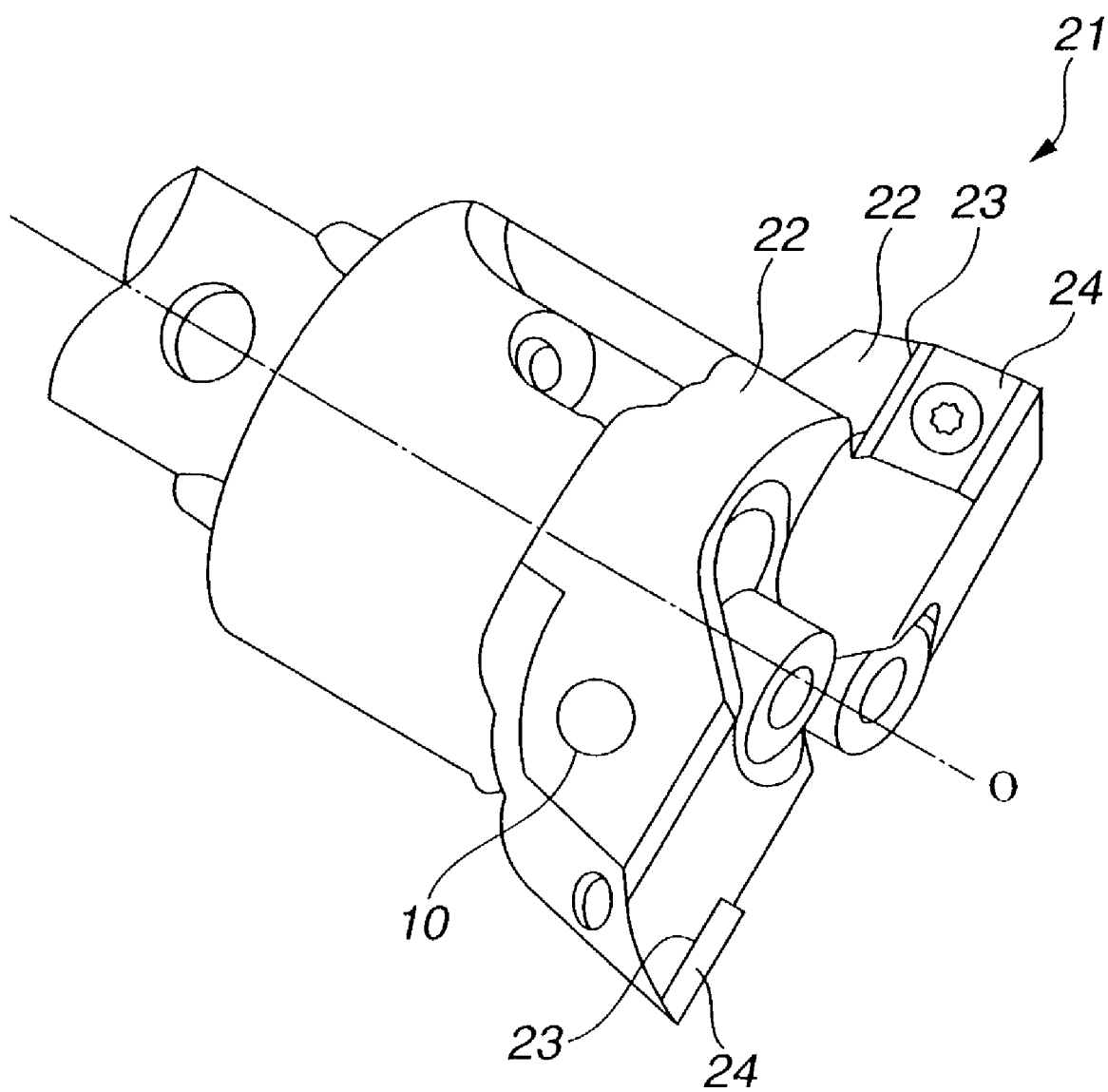
FIG. 6 is a perspective view of the information-holding unit according to still another embodiment of this invention.

Another form of the information-holding unit may be a cutter cartridge 21 as shown in FIG. 6. This cartridge 21 has the reference rotation axis O and comprises a plurality of cartridge bodies 22 (two cartridge bodies 22 in this embodiment) as holders, and mounting seats 23 are respectively provided at the top ends of the respective cartridge bodies 22. The respective mounting seats 23 have throw-away chips 24 mounted thereon. A total of two RFID tags 10 are attached, at evenly spaced positions on the cartridge bodies 22 at 180 degrees apart around the circumference on the outer surface of the cartridge 21 (i.e. at symmetrical positions with respect to the rotation axis O), one RFID tag 10 at each position.

These RFID tags 10 are also to be made in different colors (for example, by making one in brown and the other in purple) so that a user can easily identify the use and details of each RFID tag 10 and can quickly and easily obtain necessary information.

Similar to the tool 1 described above, the cutter cartridge 21 having the above-described construction can also increase the storage capacity as a whole without changing the storage capacity of the respective RFID tags themselves and without extending the information transferring time. Also, it is unnecessary to increase the driving power per RFID tag 10. It is possible to attain a good rotation balance even at the time of high-speed rotations of the cartridge 21. This cartridge 21 can also be used for the system 100 in the same manner as in the aforementioned embodiment.

Figure 7:
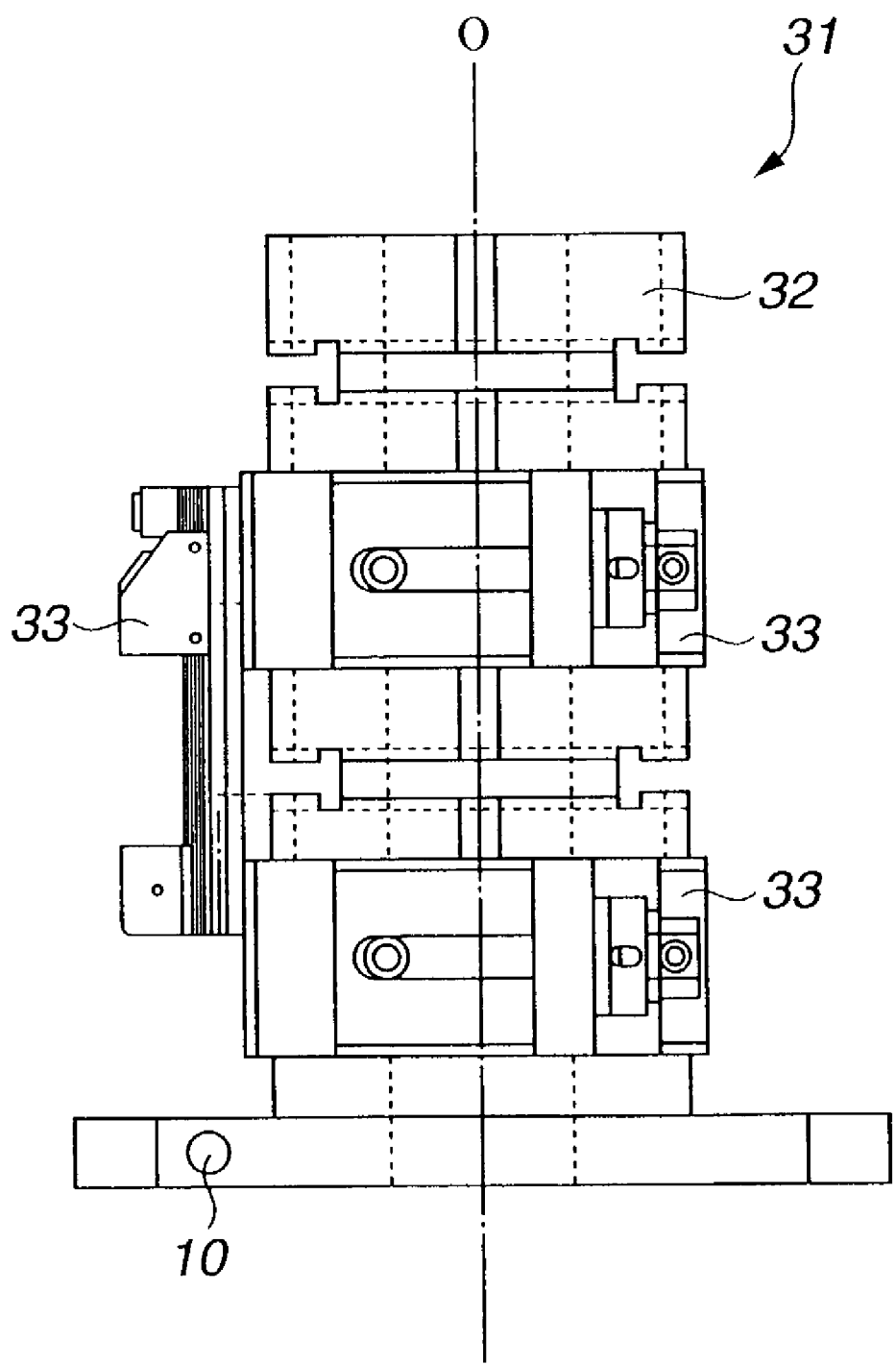
FIG. 7 is a side view of the information-holding unit according to a further embodiment of this invention.

Still another type of information-holding unit may be a work mounting jig 31 as shown in FIG. 7. This work mounting jig 31 has the reference rotation axis O and comprises a block part 32 as a base of the jig that can be mounted on, for example, a machine tool, and vises 33 which are attached to the block part 32 and hold works. A total of two RFID tags 10 are attached, at evenly spaced positions at 180 degrees apart (i.e. at symmetrical positions with respect to the rotation axis O) on the side face at the bottom of the block part 32, one RFID tag 10 at each position.

These RFID tags 10 are also to be made in different colors (for example, by making one in yellow and the other in gray) so that a user can easily identify the use and details of each RFID tag 10 and can quickly and easily obtain necessary information.

Similar to the tool 1 described above, the work mounting jig 31 having the above-described construction can also increase the storage capacity as a whole without changing the storage capacity of the respective RFID tags themselves and without extending the information transferring time. Also, it is unnecessary to increase the driving power per RFID tag 10. It is possible to attain a good rotation balance even at the time of high-speed rotations of the work mounting jig 31. This work mounting jig 31 can also be used for the system 100 in the same manner as in the aforementioned embodiment.

Furthermore, the information-holding unit of this invention is not limited to the rotating body as long as a plurality of RFID tags with arbitrary specific information stored therein are mounted, and a wide variety of articles can be adopted such as lathes, portable terminals, various components, automatic guided vehicles, various containers, and various devices.

Concerning this embodiment, the information-holding unit with two RFID tags mounted thereon has been described. However, without limitation to such construction, more than two RFID tags may be provided. In this case, it is desirable that the respective RFID tags 10 are mounted at evenly spaced positions at the same degrees apart so that the RFID tags 10 are placed symmetrically with respect to the rotation axis O. It is also desirable that the respective RFID tags 10 are to be made in different colors so that it is possible to easily identify the use and details of each RFID tag 10.

Concerning this embodiment, the case in which one RFID tag 10 stores information about the tool 1 and the other RFID tag 10 stores information about the system 100 has been described. However, without limitation to such construction, an end user (for example, a user who utilizes the system 100 using the information-holding unit with the RFID tags 10 mounted thereon) may store any information in the RFID tags 10.

Moreover, concerning this embodiment, the case in which a home page method is employed for the information management on the system 100 provider's side. However, without limitation to such method, CDs, DVD, FDs, HDs or the like with the above-mentioned management information stored therein in advance may be provided. Furthermore, the server may retain, in part or in whole, the producer-side information about the tool 1.

As described above, since the information-holding unit of this invention has a plurality of RFID tags (or information carriers) with specific information stored therein, it is possible to increase the storage capacity as a whole without changing the storage capacity of the respective RFID tags themselves, without extending the information transferring time, and without increasing costs required per RFID tag. Even if the type of RFID tag is used that saves power in an IC chip by using high-frequency waves to be transmitted as a power source and operates with the saved power as the power source, it is possible to increase the storage capacity as a whole without increase the driving power per RFID tag.

What is claimed is:

1. An information-holding unit comprising:
    a plurality of information carriers with specific different information stored in each, at least one of the information carriers storing information about the information-holding unit for a machine to use and another one of the information carriers storing information about reference information of the information-holding unit for a human to use, colors of the information carriers being different from one another; and
    a mounting body, said mounting body having a rotation axis and rotating thereabout at speeds sufficient to effect cutting operations, the mounting body being symmetrical about said rotation axis to avoid imbalance when rotating, the information carriers being mounted on said mounting body,
    wherein each of the information carriers is an RFID tag, the information carriers rotate about the rotation axis of said mounting body, the information carriers are mounted symmetrically with respect to the rotation axis, and the information carriers are mounted on the mounting body at balanced positions to minimize rotation imbalance in the unit, and
    wherein the mounting body is any one of a work mounting jig, a cutter, a cutter cartridge, or a tool holder.

2. The information-holding unit according to claim 1, wherein at least one of the information carriers stores a single code of the information-holding unit.

3. The information-holding unit according to claim 1, wherein at least one of the information carriers stores information about a system using the information-holding unit.

4. The information-holding unit according to claim 1, wherein at least one of the information carriers stores information about a user of the information-holding unit and a system using the information-holding unit.

5. The information-holding unit according to claim 1, wherein at least one of the information carriers stores information about a user of the information-holding unit.

6. The information-holding unit according to claim 1, wherein at least one of the information carriers stores information about a system using the information-holding unit, and at least another one of the information carriers stores information about a user of the information-holding unit and/or the system using the information-holding unit.

7. An information-holding unit comprising:
    a plurality of information carriers with specific different information stored in each, and
    a mounting body, said mounting body having a rotation axis and rotating thereabout at speeds sufficient to effect cutting operations, the mounting body being symmetrical about said rotation axis to avoid imbalance when rotating, the information carriers being mounted thereon,
    wherein each of the information carriers is an RFID tag, at least one of the information carriers storing information about the information-holding unit, and at least one of the information carriers storing information about both a user of the information-holding unit and a system using the information-holding and, unit
    wherein the mounting body is any one of a work mounting jig, a cutter, a cutter cartridge, or a tool holder.

* * * * *